United States Patent
Barthelme et al.

(10) Patent No.: US 12,140,183 B2
(45) Date of Patent: Nov. 12, 2024

(54) BEARING ASSEMBLY AND METHOD FOR MANUFACTURING A BEARING ASSEMBLY

(71) Applicant: AKTIEBOLAGET SKF, Gothenburg (SE)

(72) Inventors: Juergen Barthelme, Grettstadt (DE); Helmut Hauck, Euerbach (DE); Stefanie Seufert, Rothhausen (DE); Hubert Herbst, Gädheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 160 days.

(21) Appl. No.: 18/096,261

(22) Filed: Jan. 12, 2023

(65) Prior Publication Data

US 2023/0235788 A1  Jul. 27, 2023

(30) Foreign Application Priority Data

Jan. 24, 2022 (DE) .......................... 102022200757.3

(51) Int. Cl.
| | |
|---|---|
| F16C 19/06 | (2006.01) |
| F16C 33/58 | (2006.01) |
| F16C 35/04 | (2006.01) |
| F16C 35/067 | (2006.01) |
| F16C 35/077 | (2006.01) |

(Continued)

(52) U.S. Cl.
CPC ............ *F16C 33/583* (2013.01); *F16C 19/06* (2013.01); *F16C 35/045* (2013.01); *F16C 35/067* (2013.01); *F16C 35/077* (2013.01); *F16C 43/04* (2013.01); *B29L 2031/04* (2013.01); *F16C 2220/04* (2013.01); *F16C 2220/06* (2013.01)

(58) Field of Classification Search
CPC ...... F16C 19/06; F16C 33/583; F16C 35/042; F16C 35/045; F16C 35/047; F16C 35/067; F16C 35/077; F16C 43/04; F16C 2220/04; F16C 2220/06; B29L 2031/04; H02K 5/173
See application file for complete search history.

(56) References Cited

U.S. PATENT DOCUMENTS

| | | | |
|---|---|---|---|
| 8,258,659 B2* | 9/2012 | Debrailly | H02K 5/1732 |
| | | | 310/90 |
| 2002/0130570 A1* | 9/2002 | Howe | H02K 5/08 |
| | | | 310/89 |
| 2013/0119750 A1* | 5/2013 | Greven | B22D 18/06 |
| | | | 301/110 |

FOREIGN PATENT DOCUMENTS

| | | | | |
|---|---|---|---|---|
| DE | 102008007168 A1 * | 8/2009 | | F16C 19/06 |
| EP | 0543777 A2 * | 5/1993 | | |

(Continued)

OTHER PUBLICATIONS

Unpublished U.S. Appl. No. 17/746,373.
Unpublished U.S. Appl. No. 17/824,928.
Unpublished U.S. Appl. No. 17/824,931.

*Primary Examiner* — Phillip A Johnson
(74) *Attorney, Agent, or Firm* — J-TEK LAW PLLC; Scott T. Wakeman; Mark A. Ussai

(57) ABSTRACT

A bearing assembly includes a bearing unit formed from a stationary bearing ring configured to be connected to a stationary component and a rotatable bearing ring configured to be connected to a rotatable component and a bearing carrier connected to the stationary bearing ring in a rotationally fixed manner, for example, by overmolding. The bearing carrier includes at least one notch that exposes at least one section of the stationary bearing ring.

16 Claims, 2 Drawing Sheets

(51) Int. Cl.
 *F16C 43/04* (2006.01)
 *B29L 31/04* (2006.01)

(56) References Cited

FOREIGN PATENT DOCUMENTS

| EP | 2865538 A1 | * | 4/2015 | ............. B60B 35/18 |
| JP | 2009041584 A | * | 2/2009 | |

* cited by examiner

BEARING ASSEMBLY AND METHOD FOR MANUFACTURING A BEARING ASSEMBLY

CROSS-REFERENCE

This application claims priority to German patent application no. 10 2022 200 757.3 filed on Jan. 24, 2022, the contents of which are fully incorporated herein by reference.

TECHNOLOGICAL FIELD

The present disclosure is directed to a bearing assembly that includes a bearing unit attached to a bearing carrier, a fixing device for fixing a stationary bearing ring during the manufacture of such a bearing assembly and a method for manufacturing the bearing assembly.

BACKGROUND

Rolling-element bearings can be used for supporting rotating components with respect to stationary components, for example as a non-locating or locating bearing for supporting a rotating shaft in a housing. Here the bearing rings are connected to the rotating component and to the stationary component, e.g., the housing and the shaft, such that this connection remains fixed as constantly as possible under all operating states and environmental conditions of the application. A bearing carrier can be used for attaching the stationary bearing ring to the stationary component, and the bearing carrier can be overmolded to the corresponding bearing ring. The bearing unit is then attached to the stationary component by the bearing carrier.

The bearing rings themselves are usually highly precisely manufactured, for example, by a final grinding process, and correspondingly have highly precisely manufactured contact surfaces. However, if the stationary bearing ring is now overmolded with the bearing carrier, this leads to the previous precision no longer being achieved. If the bearing unit overmolded with the bearing carrier is now mounted on a corresponding counter-contour of the stationary component, e.g., pressed in to an opening, then the positional accuracy of the stationary component with respect to the bearing assembly is significantly worse than was the case with the original high-precision contact surfaces of the stationary bearing ring and the stationary component.

SUMMARY

It is therefore an aspect of the present disclosure to provide a bearing assembly which, despite the use of an overmolded bearing carrier, allows for a precise positioning of the bearing assembly with respect to the stationary component.

The disclosed bearing assembly includes a bearing carrier and a bearing unit carried by the bearing carrier. The bearing unit is configured to support a rotating component relative to a stationary component. The bearing unit includes a first stationary bearing ring and a second rotatable bearing ring, the rotatable bearing ring being connectable to the rotating component and the stationary bearing ring being connectable to the stationary component by the bearing carrier such that the stationary bearing ring and the stationary component are rotationally fixed.

The stationary component can be, for example, a housing; in this case the stationary bearing ring is usually the outer bearing ring of the bearing unit. The rotating component can be, for example, a shaft or the like. Alternatively the stationary component can be a hub, wherein in this case the inner bearing ring is the stationary bearing ring.

In order to allow a precise positioning and installation of the bearing assembly with respect to the stationary component, the bearing carrier includes at least one notch that exposes at least one section of the stationary bearing ring. Due to this exposed section of the stationary bearing ring, one of the highly precisely manufactured surfaces of the bearing ring is available to be contacted for alignment purposes during the installation on the stationary component. In contrast to previous assemblies of bearing carriers in which the highly precisely manufactured surfaces of the bearing ring are completely surrounded by the bearing carrier, in the present bearing assembly it is possible to contact the bearing ring on a highly precisely manufactured surface, and thus also to align the bearing ring using this surface.

In addition, this notch of the bearing carrier has further advantages in the manufacturing of the bearing assembly, in particular in the production of the bearing carrier. Up to now, during the production of the bearing carrier the bearing support units have always been secured by the bearing ring that is not overmolded. However, this has the disadvantage that the bearing ring to be overmolded is not fixed directly, but only indirectly via the other bearing ring, which in turn leads to movement of the bearing ring to be overmolded, at least within certain bounds. In particular, the bearing ring to be overmolded can move in the radial, axial and circumferential directions. This leads to tolerances in the manufacturing of the bearing carrier and thus possibly to a clearance between rotatable and stationary component, e.g., between shaft and housing, after the final assembly of the bearing assembly.

When the bearing support unit has been fixed in the bore of the inner ring during the injection-molding process of the bearing carrier, as was previously the case, then after cooling, the bearing bore of the bearing carrier has a high positional inaccuracy with respect to the bearing carrier. The cause is the technically unavoidable clearance bearing between the bearing inner and outer ring. For example, in electric motors, after assembly of the electric motor this causes the rotor shaft (pressed into the inner-ring bore) to now also have a high positional inaccuracy with respect to the stator since both the stator and the bearing carrier are fixed in the common motor housing. This is not productive in particular in the case of fast-running drive motors of, for example, electric vehicles.

With the bearing assembly disclosed here, the bearing ring to be overmolded, in this case the stationary bearing ring, is fixed by a fixing device as is described further below. Since the bearing ring to be overmolded is fixed, the positional accuracy between the bearing ring and the overmolded bearing carrier is improved due to the non-existent movement of the bearing ring to be overmolded. This in turn has advantages in the final assembly, since a more precise manufacturing of the bearing carrier, in particular with respect to the positional accuracy, leads to smaller tolerances between the bearing carrier and the stationary component and with electric motors thus leads to a high positional accuracy between the rotor shaft and the stator.

Furthermore, the use of the fixing device results in the need for the notches in the bearing carrier, as is explained in more detail further below. These notches in turn result in the exposed sections of the stationary bearing ring that offer the advantages described above. The access to the precisely manufactured surfaces of the stationary bearing ring improves the positional accuracy between the rotor shaft and the stator in the case of electric motors even further.

According to one embodiment, the bearing carrier includes several notches that are distributed circumferentially, preferably uniformly. At least three notches are preferably provided that are distributed circumferentially. In this way, during an installation of the bearing assembly in the stationary component, the bearing assembly can be gripped at these three notches or the sections of the stationary bearing ring that are exposed at these notches. At least three notches, and thus at least three exposed sections of the bearing ring, allow for stable gripping, since a misalignment of the bearing ring can thus be effectively prevented.

The notches can be configured either as blind holes, i.e., non-through openings, and/or as axially continuous holes. These notches have the advantage firstly that the design of the fixing tool can be realized cost-effectively by the use of standard gripper elements, and secondly, in the case of axially continuous holes, a gripping is possible using the gripper elements from both sides of the bearing carrier, which in turn allows a greater flexibility in the design of the process flow.

Alternatively the notch of the bearing carrier can be configured as a circumferential step, that is, the notch extends completely circumferentially. In this case, both the fixing device for the manufacturing of the bearing carrier and later a device for installing the bearing assembly on the stationary component are configured sleeve-shaped and circumferentially surround the stationary bearing ring. The advantage of such a sleeve-shaped, circumferentially surrounding fixing device is reflected in a drastically reduced risk of deforming the bearing ring during the fixing.

The bearing carrier can be manufactured from plastic, preferably as an injection-molded part. In particular, the bearing carrier can be manufactured from a thermoplastic or a thermoset. A combination of these materials is also possible.

According to one embodiment, the exposed section of the stationary bearing ring is provided on a radial surface of the stationary bearing ring, and the radial surface contacts the bearing carrier. In particular, the radial surface can be an outer surface of the stationary bearing ring. In this case, the fixing device for manufacturing the bearing carrier can on the one hand contact and hold the stationary bearing ring on an outer surface and additionally fix it on an end surface of the bearing ring. In this way, during the manufacturing of the bearing carrier it can be ensured that the stationary bearing ring cannot misalign in any direction. During the installation of the bearing assembly in the stationary component, it is preferred in particular when the exposed section is located on an outer surface of the stationary bearing ring since this outer surface is particularly well suited to serve as alignment surface with respect to the stationary component.

According to a further aspect, a fixing device is disclosed for fixing the stationary bearing ring during the manufacture of the bearing assembly as is described above. The fixing device is configured to hold the stationary bearing ring and is furthermore configured to interact with an injection mold in order to overmold the stationary ring with the bearing carrier.

As already explained above, the fixing device fixes the bearing ring that is to be overmolded with the bearing carrier. In contrast thereto, up to now the bearing ring that was not to be overmolded has previously been fixed. Due to the fixing of the bearing ring to be overmolded, it can now be ensured that the bearing unit has an improved positioning with respect to the bearing carrier. Since the bearing ring to be overmolded is fixed, the bearing carrier can be manufactured very precisely with respect to this bearing ring, which in turn leads to a high positional accuracy both of the bearing unit with respect to the bearing carrier and of the bearing assembly with respect to the stationary component and thus also of the rotatable component with respect to the stationary component. This is advantageous in particular when such a bearing assembly as can be manufactured by the fixing device is used in fast-running drive motors that require a high positional accuracy of the rotor shaft with respect to the stator.

According to one embodiment, the fixing device includes fixing claws that are configured to contact the exposed sections of the stationary bearing ring. The fixing claws are used in order to, on the one hand, grip the stationary bearing ring, and on the other hand to position and to fix it. If the bearing carrier is now molded in by the injection mold, these fixing claws form locations at which the notches of the bearing carrier are formed after the end of the manufacturing of the bearing carrier. These notches furthermore have the advantage that the fixing claws can be removed through them in a simple manner.

The features and advantages described above with respect to the bearing assembly correspondingly apply to the fixing device, and vice versa.

According to a further aspect, a method is proposed for the manufacturing of a bearing assembly as is described above. The method includes the steps of: fixing the stationary bearing ring on which the bearing carrier is to be provided and overmolding the fixed stationary bearing ring with the bearing carrier. As already explained above, the stationary bearing ring is first fixed by a fixing device, and an injection mold is subsequently disposed around the stationary bearing ring and the fixing device. The material of the bearing carrier, e.g., a plastic material, is then injected in this injection mold in order to form the bearing carrier. After the bearing carrier cools down and hardens, both the injection mold and the fixing device can be removed.

The features and advantages described above with respect to the bearing assembly as well as the fixing device correspondingly apply to the method, and vice versa.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
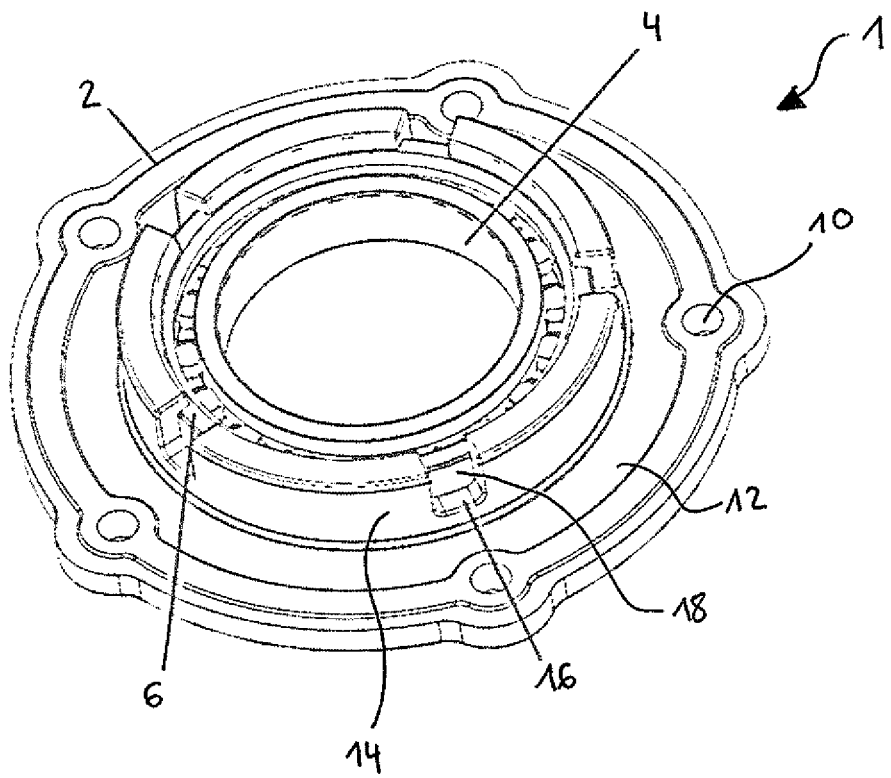
FIG. 1 is a perspective view of a bearing assembly with a bearing carrier according to an embodiment of the present disclosure.

FIG. 1 shows a bearing assembly 1 that includes a bearing carrier 2 in which a bearing unit is disposed, the bearing unit including an inner ring 4 and an outer ring 6. The exemplary embodiments depicted show a bearing assembly 1 that can be used, for example, to support a shaft in a housing, where the housing is stationary and the shaft is rotating. Of course, the bearing assembly 1 is also usable in other applications, for example, with a stationary bolt and a rotating housing.

Figure 2:
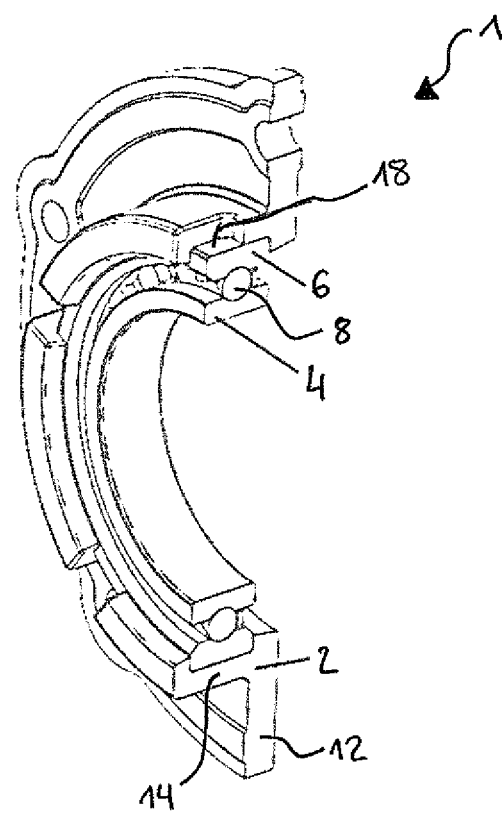
FIG. 2 is a perspective sectional view of the bearing assembly of FIG. 1.

The inner ring 4 is configured as a rotatable bearing ring, and the outer ring 6 is configured as a stationary bearing ring and connected to the bearing carrier 2. Rolling elements 8 are disposed between the bearing rings 4, 6, as can be seen in particular in FIG. 2. In the exemplary embodiment depicted, the bearing unit is configured as a ball bearing, but all other types of rolling-element bearings, such as, for example, roller bearings, or plain bearings, are also possible.

The bearing carrier 2 includes receptacles, in this case through-openings 10, into which attachment means, for example, screws or other threaded fasteners, can be introduced for attaching the bearing carrier 2 to the housing (not depicted). Other receptacles are also possible, such as, for example, threaded through-stems or separate inserts.

In the exemplary embodiments depicted, the bearing carrier 2 includes a flange 12 including the receptacles 10 and a shoulder 14 in the center of which the bearing unit is disposed.

In the region of the shoulder 14, the bearing carrier 2 includes a plurality of notches 16. These notches 16 cause sections 18 of the bearing outer ring 6 to be exposed. During the installation of the bearing assembly 1 into the stationary component, e.g., the housing, these sections 18 can be used in order to allow access to the highly precisely manufactured surface of the outer ring 6 and to thereby allow a precise alignment of the bearing assembly 1 with respect to the stationary component.

Figure 3:
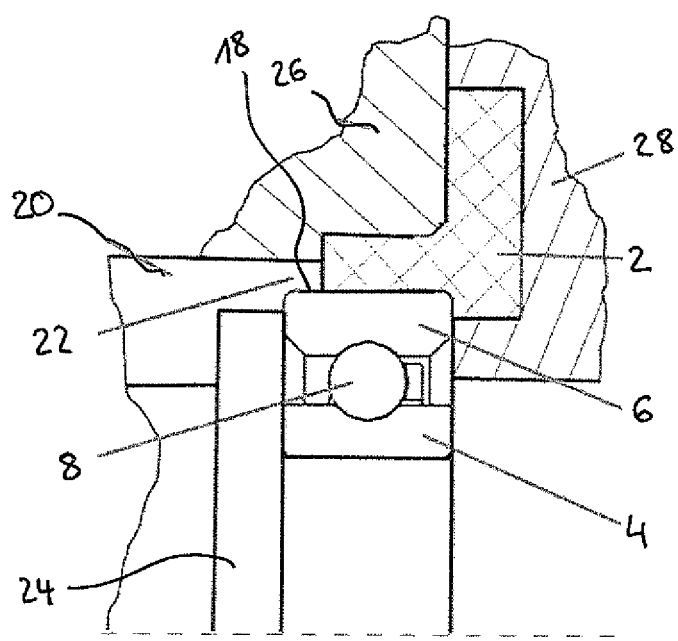
FIG. 3 is a sectional view of a fixing device for manufacturing the bearing assembly of FIGS. 1 and 2.

During the manufacturing of the bearing carrier 2, the notches 16 or the exposed sections 18 furthermore have the advantage that a fixing device 20, as is described in the following with reference to FIG. 3, can grip and fix the bearing outer ring 6 at these exposed sections 18. The bearing carrier 2 is then overmolded on the bearing outer ring 6, with these sections 18 remaining exposed/uncovered by the overmolding material.

A fixing device 20 for use in manufacturing the bearing carrier 2 is now described in the following with reference to FIG. 3. The fixing device 20 includes fixing claws 22 as well as an optional holding element 24. The holding element 24 can be used in order fix both the inner ring 4 and the outer ring 6 in the axial direction. The fixing claws 22 in turn contact a radial outer surface of the outer ring 6 at different location at which section 18 of the bearing outer ring are exposed after the bearing carrier 2 is manufactured.

The fixing claws 22 can contact and grip the bearing outer ring 6 at multiple locations. Alternatively, the fixing claws 22 can also be formed as a sleeve and completely surround the bearing outer ring 6 circumferentially.

After the bearing outer ring 6 has been fixed by the fixing device 20, injection molds 26, 28 can be arranged, and the material of the bearing carrier 2 can then be introduced into them. For this purpose the injection molds 26, 28 can include an opening into which the plastic material of the bearing carrier 2 is injected. After the material of the bearing carrier 2 has cooled down and hardened, both the injection molds 26, 28 and the fixing device 20 can be removed again. The notches 16 of the bearing carrier 2 are now located at the sections at which the fixing claws 22 have contacted the bearing outer ring 6.

The notches 16 of the bearing carrier 2 or the exposed sections 18 of the bearing outer ring 6 thus have on the one hand the advantage that they allow the bearing outer ring 6 to be contacted by the fixing claws 22 during the manufacture of the bearing carrier 2, and have on the other hand the advantage that, after the completion of the bearing carrier 2, the exposed sections 18 of the bearing outer ring 6 offer an access to the highly precisely manufactured surfaces of the bearing outer ring 6 for installing the bearing assembly 1 in a housing.

Due to the bearing assembly described here, on the one hand a precise manufacturing of a bearing carrier is made possible, and on the other hand a bearing assembly is provided that allows a precise positioning on a stationary component.

REFERENCE NUMBER LIST

1 Bearing assembly
2 Bearing carrier
4 Inner ring
6 Outer ring
8 Rolling element
10 Receptacles
12 Flange
14 Shoulder
16 Notches
18 Exposed sections
20 Fixing device
22 Fixing claws
24 Holding element
26 Injection mold
28 Injection mold

What is claimed is:

1. A bearing assembly comprising:
a bearing unit comprising a stationary bearing ring configured to be connected to a stationary component and a rotatable bearing ring configured to be connected to a rotatable component, and
a bearing carrier connected to the stationary bearing ring in a rotationally fixed manner,
wherein the bearing carrier includes at least one notch that exposes at least one section of the stationary bearing ring.

2. The bearing assembly according to claim 1,
wherein the bearing carrier covers an entire radial surface of the stationary bearing ring except for the at least one section of the stationary bearing ring exposed at the at least one notch.

3. The bearing assembly according to claim 2,
wherein the bearing carrier covers an entire axial surface of the stationary bearing ring except for the at least one section of the stationary bearing ring exposed at the notch.

4. The bearing assembly according to claim 2, wherein the at least one notch comprises a plurality of uniformly circumferentially distributed notches.

5. The bearing assembly according to claim 1,
wherein the at least one exposed section of the stationary bearing ring includes a radially outer surface of the bearing ring, an axial surface of the bearing ring and a junction of the radially outer surface of the stationary bearing ring and the axial surface of the stationary bearing ring.

6. The bearing assembly according to claim 5,
wherein the bearing carrier is overmolded onto the stationary bearing ring.

7. The bearing assembly according to claim 6, wherein the stationary bearing ring is an outer bearing ring.

8. The bearing assembly according to claim 1, wherein the at least one notch is a blind hole and/or an axially continuous hole.

9. The bearing assembly according to claim 1, wherein the notch is configured as a circumferential step.

10. The bearing assembly according to claim 1, wherein the bearing carrier is manufactured from plastic.

11. The bearing assembly according to claim 1, wherein the bearing carrier is overmolded on the stationary bearing ring.

12. The assembly according to claim 11, wherein the fixing device includes fixing claws contacting the exposed sections of the stationary bearing ring.

13. The bearing assembly according to claim 1, wherein the at least one section of the stationary bearing ring is on a radial surface of the stationary bearing ring.

14. The bearing assembly according to claim 13, wherein the radial surface is a radially outer surface of the stationary bearing ring.

15. An assembly comprising:
a bearing assembly according to claim 1, and
a fixing device for fixing the stationary bearing ring in an injection mold to overmold the bearing carrier on the stationary bearing ring.

16. A method comprising:
providing a bearing ring comprising an inner ring and an outer ring,
clamping a first one of the inner ring and the outer ring in a fixing device having fixing claws,
placing the first one of the inner ring and the outer ring in an injection mold, and
overmolding a bearing carrier on the first one of the inner ring and the outer ring such that the fixing claws form a plurality of notches in the bearing carrier at which a surface of the first one of the inner ring and the outer ring is not covered by the bearing carrier.

* * * * *